INVENTOR.
ROBERT H. JENKINS
BY
Carl V. Olson
ATTORNEY

INVENTOR.
ROBERT H. JENKINS
BY
Carl V. Olson
ATTORNEY

United States Patent Office 3,303,482
Patented Feb. 7, 1967

3,303,482
REDUNDANT RECORDING SYSTEM
WITH PARITY CHECKING

Robert H. Jenkins, Audubon, N.J., assignor to Radio Corporation of America, a corporation of Delaware Filed Feb. 25, 1963, Ser. No. 260,708
12 Claims. (Cl. 340—174.1)

This invention relates to redundant signal systems, and particularly to systems useful in the recording and reproducing of digital signals.

Systems for recording digital information on a recording medium, such as magnetic tape, and for reproducing the recorded signal, are desired to have high operating speed, high information packing densities and very high accuracy. An obstacle in the way of achieving these characteristics is the lack of perfect uniformity in practically realizable magnetic recording media. It is known to achieve high accuracy by recording the same digital information redundantly on both of two separate tracks on the recording medium and, when reproducing, to couple the reproduced digital information signals from both tracks to an output terminal or utilization device. Such a system presently in commercial use has an accuracy of one error in about $10^8$ information bits reproduced. There is a need for a comparable system that may provide an accuracy of only one error, or less, in about every $10^{12}$ information bits reproduced.

It is the general object of this invention to provide a redundant digital signal system useful in magnetic recording and reproducing systems for effecting increased accuracy, or increased operating speed, or both.

According to an example of this invention, a plurality of digital signals are redundantly recorded on both of two groups of recording tracks from which two respective groups of reproduced signals are derived. Parity checking means is provided for checking the parity of the reproduced signals of one group, and for checking the parity of the reproduced signals of the other group. Gating means is provided which is responsive to the outputs of the parity checking means and which is operative to select the group of signals having correct parity when only one group of signals has correct parity, to select both groups of reproduced signals when neither group has correct parity, and to select one group or both groups of reproduced signals when both groups of reproduced signals have correct parity.

Figure 1:
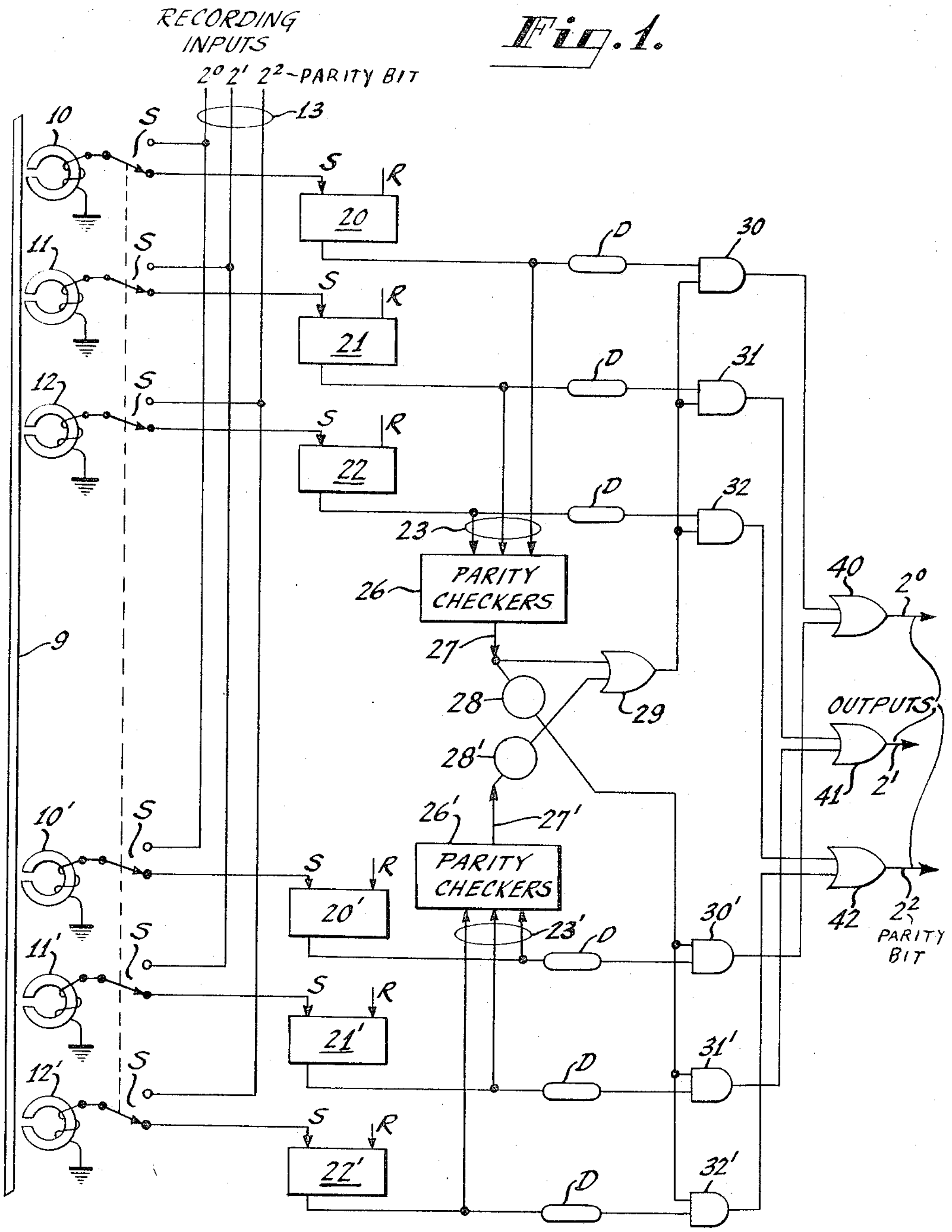
FIG. 1 is a diagram illustrative of a redundant magnetic recording and reproducing system constructed according to the teachings of this invention.
Figure 2:
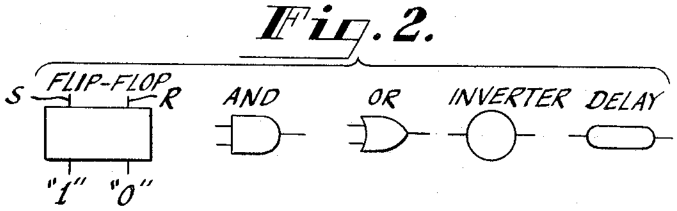
FIG. 2 is a key to the logic diagram symbols employed in the system of FIG. 1.

Reference is now made in greater detail to FIG. 1 which shows a magnetic recording medium 9 which may be a magnetic tape or a magnetic drum. A first group of magnetic recording and reproducing heads 10, 11 and 12 is positioned with relation to the magnetic tape 9 to define parallel, non-overlapping recording tracks on the tape 9 when the tape is moved relative to the heads. The heads 10, 11 and 12 are normally arranged side-by-side or transversely of the direction of motion of the tape 9, rather than displaced along the tape as shown in the drawing. The three heads shown are illustrative of systems which normally will employ a larger number of heads. There is also provided a second group of magnetic recording and reproducing heads 10', 11', and 12' which will normally be mounted in side-by-side relation with heads 10, 11 and 12, although they are shown displaced in the drawing for clarity of functional illustration. The arrangement of the heads should preferably be such that heads 10 and 10' are spaced apart from each other so that they both will not be affected by a single imperfection in the tape 9. Similarly, heads 11 and 11' should be spaced apart, and heads 12 and 12' should be spaced apart.

Recording input signal conductors 13 may be connected through ganged switches S to the electrical coils of the recording and reproducing heads according to a scheme wherein a $2^0$ signal conductor is connected to heads 10 and 10', a $2^1$ signal conductor is connected to heads 11 and 11', and a $2^2$ signal conductor is connected to heads 12 and 12'. In the embodiment disclosed, the $2^2$ bit is utilized as the parity bit. The coils of heads 10, 11, 12, 10', 11', and 12' may be connected for reproducing purposes through switches S to the set inputs S of respective flip-flops 20, 21, 22, 20', 21' and 22'. Each of the flip-flops also has a reset input R to which reset pulses are applied from a timing pulse source prior to the time that the next following digital signal will be received from the corresponding head. The switches S are not needed if each of the heads 10 through 12' is a record and reproduce head pair having a separate recording winding permanently connected to a recording input and having a separate reproducing winding permanently connected to a flip-flop.

The "1" outputs of the flip-flops 20, 21, 22, 20', 21' and 22' are coupled through circuits D to inputs of respective coincidence circuits such as "and" gates 30, 31, 32, 30', 31' and 32'. The delay circuits D may be needed to insure that the inputs to the "and" gates arrive in proper time sequence. The delay circuits D are preferably pulse stretcher circuits which delay the trailing edges of signals from the corresponding flip-flops. The output of "and" gates 30 and 30' are connected as inputs to an "or" gate 40 which provides a $2^0$ output. The outputs of "and" gates 31 and 31' are coupled to an "or" gate 41 providing a $2^1$ output. Similarly, "and" gates 32 and 32' are coupled to an "or" gate 42 which provides a $2^2$ output.

The "1" outputs of flip-flops 20, 21 and 22 are also connected over lines 23 to a parity checker 26. The "1" outputs of flip-flops 20', 21' and 22' are similarly connected over lines 23' to a second parity checker 26'. The output 27 of parity checker 26 is connected through an inverter 28 to inputs of "and" gates 30', 31' and 32'. Similarly, the output 27' of parity checker 26' is coupled through an inverter 28', and through an "or" gate 29 to inputs of "and" gates 30, 31 and 32. The output 27 of parity checker 26 is also connected to an input of the "or" gate 29.

In the operation of the recording and reproducing system of FIGURE 1, the switches S are put in their upper "record" positions when it is desired to record. Information is preferably recorded simultaneously on all of the recording heads 10, 11, 12, 10', 11' and 12'. The $2^0$ bit input signal of a word to be recorded is applied by one of conductors 13 to recording heads 10 and 10'. Similarly, the $2^1$ bit input signal is applied to recording heads 11 and 11', and the $2^2$ bit input signal is applied to heads 12 and 12'.

When the information recorded on the magnetic tape 9 is to be reproduced, the ganged switches S are put in their lower "reproduce" positions. The signals induced in the electrical coils on heads 10 through 12' are individually coupled to respective flip-flops 20 to 22'. The group of reproduced signals stored in the flip-flops 20, 21 and 22 are coupled from the outputs of the flip-flops through leads 23 to the input of the parity checker 26. If correct parity is indicated at the output 27 of the parity checker 26, the output signal is inverted by inverter 28 to produce a signal applied to "and" gates 30', 31' and 32' which inhibit the "and" gates, and prevent the transmission of the second group of reproduced signals from the second group of flip-flops 20', 21' and 22' to the "or" gates 40, 41 and 42. The output at 27 of the parity checker 26 is also applied through "or" gate 29 as a signal which enables the "and" gates 30, 31 and 32, so that the first group of reproduced signals from the first group of recording heads is gated to the "or" gates 40, 41 and 42, and to the output terminals $2^0$, $2^1$ and $2^2$. The operation of a system as thus far described is such that when the first group of reproduced signals from the heads 10, 11 and 12 have the correct parity, solely the first group of reproduced signals are directed to the output terminals $2^0$, $2^1$ and $2^2$.

On the other hand, if the partiy checker 26 determines that the first group of reproduced signals from the first group of heads 10, 11 and 12 is incorrect, the output signal from the parity checker 26, as inverted by the inverter 28, enables the gates 30', 31' and 32' and causes the second group of reproduced signals from the second group of heads 10', 11' and 12' to be gated to the output terminals $2^0$, $2^1$ and $2^2$. This result obtains regardless whether or not the second group of reproduced signals from the second group of heads 10', 11' and 12' have the correct parity as determined by the parity checker 26'.

If the parity checker 26' determines that the second group of reproduced signals is correct, the output at 27' of the parity checker is inverted by the inverter 28' and is applied through "or" gate 29 to inhibit the "and" gates 30, 31 and 32 so that the first group of reproduced signals is not supplied to the output terminals $2^0$, $2^1$ and $2^2$. In this case, only the second group of signals is supplied to the output terminals $2^0$, $2^1$ and $2^2$. On the other hand, if the parity checker 26' determines that the second group of reproduced signals is incorrect, the output of the parity checker enables "and" gates 30, 31 and 32 so that the first group of reproduced signals, as well as the second group of reproduced signals, are supplied to the output terminals $2^0$, $2^1$ and $2^2$.

The last-described operating condition is one wherein both groups of signals are supplied to the output terminals when both groups of signals have incorrect parity. Utilizing both groups of signals each having incorrect parity improves the accuracy of the system because "drop-outs" (failures to reproduce recorded signals) are much more frequent than "pick-ups" (reproduction of noise signals not actually recorded) by a factor of at least three to seven times. Therefore, if the parities are incorrect, the errors are more likely due to the absence of signals that should have been reproduced. If this bit signal dropped out in one group of signals is different from the bit signal dropped out in the other group of signals, the outputs of the "or" gates 40, 41 and 42 will be correct. Thus, the outputs $2^0$, $2^1$ and $2^2$ may be correct even though the parities of the two groups of reproduced signals are both incorrect.

To summarize, the first group of signals are directed to the output terminals when the parity of the second group of signals is incorrect, the second group of signals is directed to the output terminals when the parity of the first group of signals is incorrect, both groups of signals are directed to the output terminals when the parities of both groups of signals are incorrect, and solely the first group of signals are directed to the output terminals when the parity of both groups of signals are correct.

Figure 3:
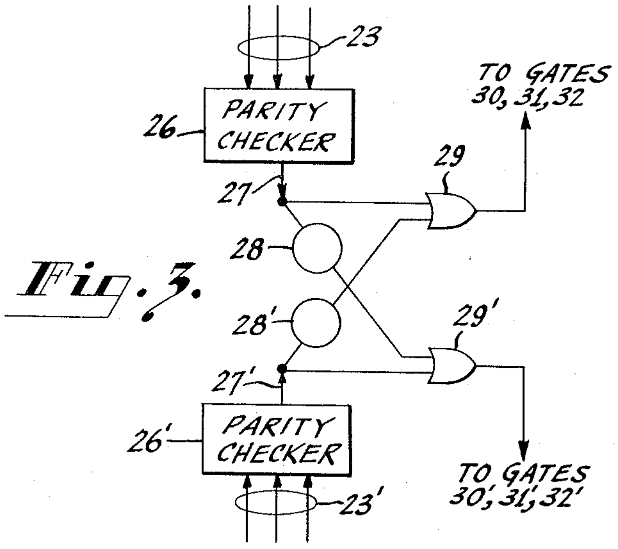
FIG. 3 is a diagram of an alternative modified arrangement that can be substituted in the system of FIG. 1.

FIG. 3 shows a modified arrangement of connections from the parity checkers 26 and 26' to the gates 30, 31, 32, 30', 31' and 32' which differs from the arrangement included in the system of FIG. 1 in the addition of an "or" gate 29' interposed in the lead from the inverter 28 to the "and" gates 30', 31' and 32'. The output 27' of the parity checker 26' is connected to an input of the added "or" gate 29'.

The operation of the system of FIG. 1 as modified according to FIG. 3 is the same as the described operation of the system of FIG. 1 except that when both parity checkers 26 and 26' provide "correct parity" output signals, the signals go through "or" gates 29 and 29' to enable all of the "and" gates 30, 31, 32, 30', 31' and 32'. This arrangement has the advantage that correct signals may appear at the output terminals $2^0$, $2^1$ and $2^2$ even though there are "drop-outs" in reproduced signals from heads 10, 11 and 12 which result in a "correct parity" signal from parity checker 26. The parity checkers, for example, may provide a "correct parity" output signal solely when there are an odd number of reproduced signals applied to the parity checker. Then, if there are two "drop-outs," there will still be an odd number of reproduced signals applied to the parity checker, and a "correct parity" signal will be generated. Nevertheless, correct output signals will appear at the output terminals $2^0$, $2^1$ and $2^2$ from the other group of heads 10', 11' and 12'. Further, correct output signals will be generated if the pair of "drop-outs" occur instead in the signals from the group of heads 10, 11 and 12, or if different pairs of "drop-outs" occur in the signals from both groups of heads.

What is claimed is:

1. The combination of a source of one group of signals and another redundant source of a second group of the same signals, parity checking means for checking the parities of the signals in the two groups, and gating means responsive to said parity checking means to select the group of signals having correct parity when only one group of signals has correct parity, and to select both groups of signals when neither group has correct parity.

2. The combination of a source of one group of signals and another source of a second group of the same signals, parity checking means for checking the parities of the reproduced signals in the two groups, and gating means responsive to said parity checking means to select the group of reproduced signals having correct parity when only one group of signals has correct parity, to select both groups of reproduced signals when neither group has correct parity, and to select one group of reproduced signals when both groups of reproduced signals have correct parity.

3. The combination of a source of one group of signals and another source of a second group of the same signals, parity checking means for checking the parities of the reproduced signals in the two groups, and gating means responsive to said parity checking means to select the group of reproduced signals having correct parity when only one group of signals has correct parity, to select both groups of reproduced signals when neither group has correct parity, and to select both groups of reproduced signals when both groups of reproduced signals have correct parity.

4. In a recording and reproducing system wherein a plurality of digital signals are redundantly recorded on both of two groups of recording tracks from which two respective groups of reproduced signals are derived, the combination of parity checking means for checking the parities of the reproduced signals in the two groups, and gating means responsive to said parity checking means to select the group of reproduced signals having correct parity when only one group of signals has correct parity, and to select both groups of reproduced signals when neither group has correct parity.

5. In a recording and reproducing system wherein a plurality of digital signals are redundantly recorded on both of two groups of recording tracks from which two respective groups of reproduced signals are derived, the combination of parity checking means for checking the parities of the reproduced signals in the two groups, and gating means responsive to said parity checking means to select the group of reproduced signals having correct parity when only one group of signals has correct parity, to select both groups of reproduced signals when neither group has correct parity, and to select one group of reproduced signals when both groups of reproduced signals have correct parity.

6. In a magnetic recording and reproducing system wherein a plurality of digital signals are redundantly recorded on both of first and second groups of recording tracks and from which respective first and second groups of reproduced signals are derived the combination of first and second parity checkers connected to check the parities of said first and second groups of reproduced signals, respectively, first and second groups of "and" gates receptive to respective first and second groups of reproduced signals, said first group of "and" gates being enabled by a correct parity output from said first parity checker and by an incorrect parity output from said second parity checker, and said second group of "and" gates being enabled by a correct parity output from said second parity checker and by an incorrect parity output from said first parity checker, and a group of "or" gates each receptive to outputs from corresponding "and" gates in both of the first and second groups of "and" gates.

7. In a magnetic recording and reproducing system wherein a plurality of digital signals are redundantly recorded on both of first and second groups of recording tracks and from which respective first and second groups of reproduced signals are derived, the combination of first and second parity checkers connected to check the parities of said first and second groups of reproduced signals, respectively, first and second groups of "and" gates receptive to respective first and second groups of reproduced signals, said first group of "and" gates being enabled by an incorrect parity output from said second parity checker, and said second group of "and" gates being enabled by an an incorrect parity output from said first parity checker, said first group of "and" gates being also enabled by a correct parity output of said first parity checker, and a group of "or" gates each receptive to outputs from corresponding "and" gates in both of the first and second groups of "and" gates.

8. In a magnetic recording and reproducing system wherein a plurality of digital signals are redundantly recorded on both of first and second groups of recording tracks and from which respective first and second groups of reproduced signals are derived, the combination of first and second parity checkers connected to check the parities of said first and second groups of reproduced signals, respectively, first and second groups of "and" gates receptive to respective first and second groups of reproduced signals, said first group of "and" gates being enabled by an incorrect parity output from said second parity checker, and said second group of "and" gates being enabled by an incorrect parity output from said first parity checker, said first group of "and" gates being also enabled by a correct parity output of said first parity checker, output terminals, and a group of "or" gates each receptive to outputs from corresponding "and" gates in both of the first and second groups of "and" gates, said "or" gates having outputs coupled to respective ones of said output terminals.

9. A redundant magnetic recording and reproducing system, comprising, means for recording each of a plurality of digital signals on respective recording tracks of a first group, and for simultaneously recording said plurality of digital signals on respective recording tracks of a second group, means for reproducing first and second groups of recorded signals from said first and second groups of tracks, respectively, parity checking means for checking the parity of the first group of reproduced signals and for checking the parity of the second group of reproduced signals, and gaiting means responsive to said parity checking means and operative when the parity of solely one group of reproduced signals is correct to pass the correct group of signals and operative when the parity of neither group of signals is correct to pass both groups of signals.

10. A redundant magnetic recording and reproducing system, comprising means for recording each of a plurality of digital signals on respective recording tracks of a first group, and for simultaneously recording said plurality of digital signals on respective recording tracks of a second group, means for reproducing first and second groups of recorded signals from said first and second groups of tracks, respectively, output terminals, parity checking means for checking the parity of the first group of reproduced signals and for checking the parity of the second group of reproduced signals, and gating means responsive to said parity checking means and operative when the parity of solely one group of reproduced signals is correct to couple the correct group of signals to the output terminals, operative when the parity of neither group of signals is correct to couple both groups of signals to the output terminals, and operative when the parity of both groups of signals is correct to couple solely one group of signals to the output terminals.

11. A redundant magnetic recording and reproducing system, comprising means for recording each of a plurality of digital signals on respective recording tracks of a first group, and for simultaneously recording said plurality of digital signals on respective recording tracks of a second group, means for reproducing first and second groups of recorded signals from said first and second groups of tracks, respectively, a first parity checking means for checking the parity of the first group of reproduced signals and a second parity checking means for checking the parity of the second group of reproduced signals, a first group of "and" gates receptive to said first group of reproduced signals and enabled by an incorrect parity output signal from said second parity checking means, a second group of "and" gates receptive to said second group of reproduced signals and enabled by an incorrect parity output signal from said first parity checking means, said first group of "and" gates being also enabled by a correct parity output signals from said first parity checking means, output terminals, and a group of "or" gates each receptive to outputs from corresponding "and" gates in both of the first and second groups of "and" gates, said "or" gates having outputs coupled to respective ones of said output terminals.

12. A redundant magnetic recording and reproducing system, comprising means for recording each of a plurality of digital signals on respective recording tracks of a first group, and for simultaneously recording said plurality of digital signals on respective recording tracks of a second group, means for reproducing first and second groups of recorded signals from said first and second groups of tracks, respectively, output terminals, parity checking means for checking the parity of the first group of reproduced signals and for checking the parity of the second group of reproduced signals, and gating means responsive to said parity checking means and operative when the parity of solely one group of reproduced signals is correct to couple solely the correct group of signals to the output terminals, and operative when the parities of the two groups of signals are both incorrect or both correct to couple both groups of signals to the output terminals.

References Cited by the Examiner

UNITED STATES PATENTS

| | | | |
|---|---|---|---|
| 2,813,259 | 11/1957 | Burkhart | 340—174.1 |

BERNARD KONICK, *Primary Examiner.*

A. I. NEUSTADT, *Assistant Examiner.*